United States Patent

[11] 3,563,595

[72] Inventor Coleman M. Slavney
 1618 Jefferson St., Madison, Wis. 53711
[21] Appl. No. 795,980
[22] Filed Feb. 3, 1969
[45] Patented Feb. 16, 1971

[54] RESILIENT BUMPER GUARD FOR MOTOR VEHICLES
 2 Claims, 3 Drawing Figs.

[52] U.S. Cl. .................................................... 293/67,
 293/71, 293/100
[51] Int. Cl. .................................................... B60r 19/04,
 B60r 19/08, B61f 19/04
[50] Field of Search ........................................ 293/64, 65,
 66, 99, 101; 293/67, 71, 100

[56] References Cited
UNITED STATES PATENTS
1,348,030  7/1920  Millard .......................... 293/71
1,744,408  1/1930  Millard .......................... 293/71
2,230,333  2/1941  Painter .......................... 293/66
2,798,756  7/1957  Corydon ........................ 293/67

Primary Examiner—Arthur L. LaPoint
Assistant Examiner—Howard Beltran
Attorneys—Joseph G. Werner, Theodore J. Long, John M. Winter and James A. Kemmeter ABSTRACT: A bumper guard for motor vehicles having a rigid, channel-shaped, base plate imbedded in and bonded to a resilient cushioning member. The base plate has a substantially vertical elongate slot with an enlarged end and the resilient cushioning member has a groove in the rear face thereof communicating with the slot for receiving the head of a mounting bolt for securing the guard to the bumper of a vehicle at the desired elevation.

PATENTED FEB 16 1971
3,563,595
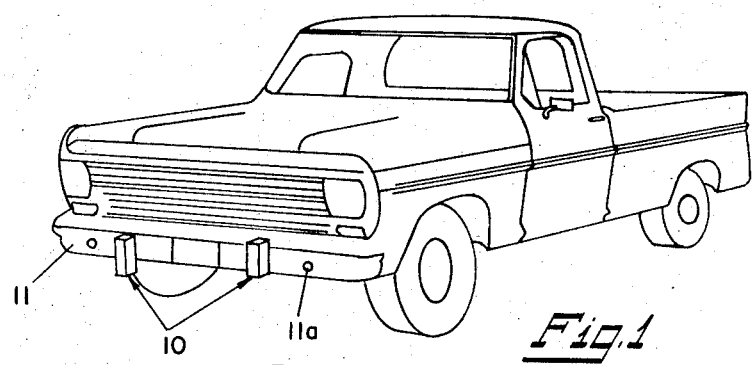
Fig. 1
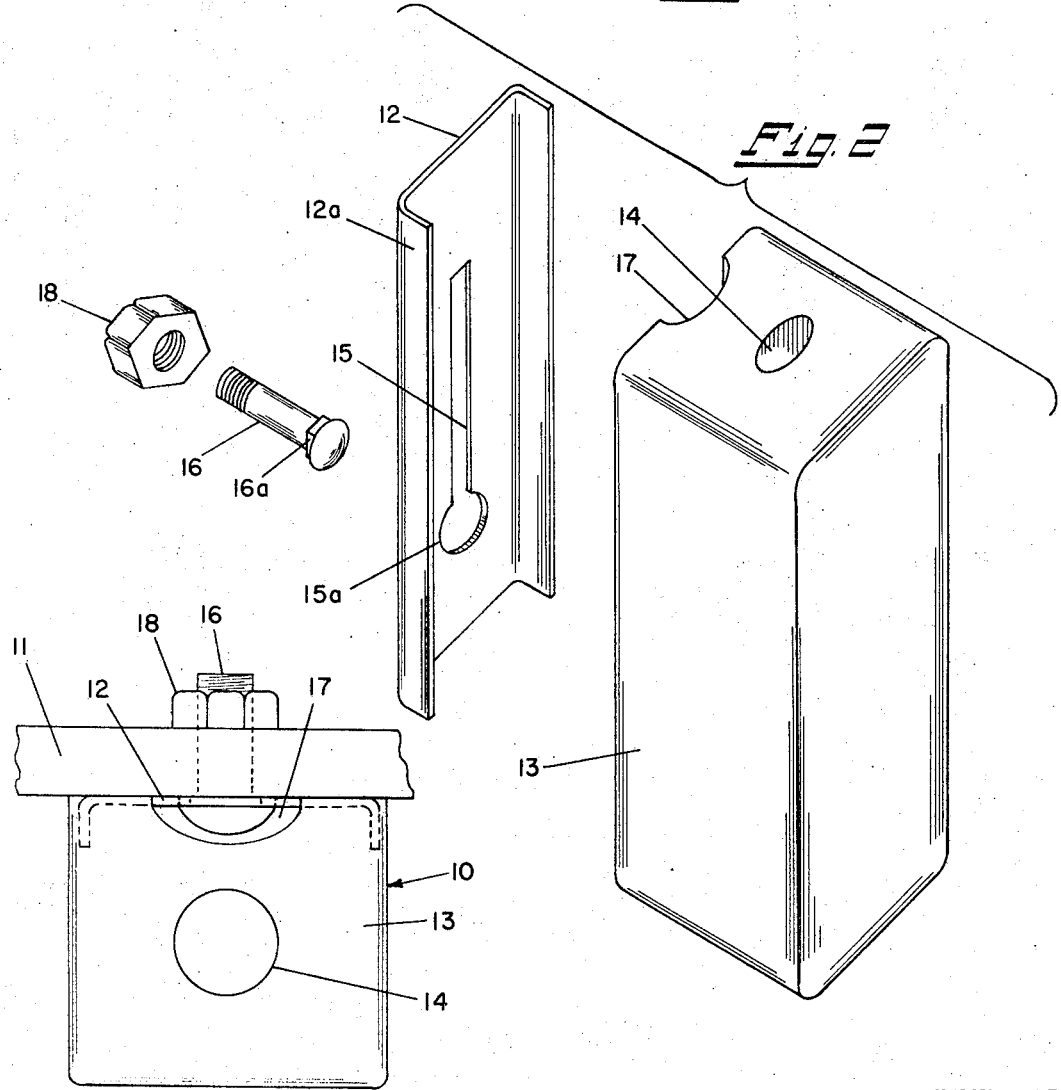
Fig. 2
Fig. 3
INVENTOR.
COLEMAN M. SLAVNEY
BY Joseph G. Werner
John M. Winter
ATTORNEYS

RESILIENT BUMPER GUARD FOR MOTOR VEHICLES

BACKGROUND OF THE INVENTION

1. Field of the Invention

My invention relates to bumper guards for motor vehicles.

2. Description of the Prior a Art

Bumpers on automobiles, trucks, buses and other types of motor vehicles are mounted at the front and the rear of the vehicles and extend beyond the body proper by a slight margin so as to allow one vehicle to bump another or be bumped by another without causing damage to the body of either. Unfortunately, the bumpers of present day motor vehicles vary tremendously in size, height and style. These factors generally make the bumpers of the vehicles ineffectual because instead of meeting each other squarely, they may miss completely or, at best, strike in such a manner that the smooth chrome surfaces of the bumpers slide over or under one another causing substantial damage to the grill, radiator, headlights, taillights and fenders of the vehicles.

Furthermore, because in most instances the bumpers extend only slightly beyond the body portions of the vehicle and in some instances the body portions, grill and lights actually extend beyond the bumper, minor damage, dents, scratches and light breakage frequently result just from normal parking and use of the vehicle. These minor body dents and scratches, not only detract from the appearance of a vehicle, but more importantly, are the starting points for deterioration of the body due to rusting.

These problems are all magnified, of course, in vehicles such as pickup and delivery trucks which normally undergo rather rough handling.

While several types of bumper guards have been developed in the past, they have not been entirely satisfactory because they suffered from one or a combination of the following shortcomings: they offered inadequate protection; they could only be used on a very limited number of bumper styles; they were difficult to mount and unsightly when mounted; and they could only be mounted at certain positions on the bumpers and, therefore, were often ineffectual.

SUMMARY OF THE INVENTION

My resilient bumper guard provides a nonslipping, shock-absorbing, protective attachment for motor vehicles.

It not only is effective in preventing minor dents and breakage, but in more serious collisions, it absorbs a substantial portion of the initial collision impact, thus, greatly reducing the extent of damage and possible personal injury.

The guard comprises a rigid, channel-shaped, base plate imbedded in and bonded to a rubber cushioning member. The guard may be mounted at a selected height on the bumper by virtue of the elongated mounting slot formed in the base plate. This adjustable feature allows the guard to be mounted at the most effective elevation on the vehicle.

The unique design of my bumper guard makes for easy installation without any special tools. The bumper guards can be mounted on the regular bumper bolts which hold the bumper on the vehicle by merely loosening these bolts and inserting the heads thereof through the enlarged end of the mounting slot and sliding the guards to the desired height. The guards are then secured by merely retightening the bumper bolts.

The guards may be mounted at other positions on the bumper if the horizontal spacing of the regular bumper bolts does not conform to the most effective spacing of the guards.

Further objects, features and advantages of my invention will be apparent from the following detailed description taken in conjunction with the accompanying drawings wherein a preferred embodiment of my invention has been selected for exemplification.

BRIEF DESCRIPTION OF THE DRAWINGS

FIG. 1 is a frontal perspective view of a pair of my bumper guards at different elevations on the bumper of a pickup truck.

FIG. 2 is an exploded perspective view showing the parts of a preferred form of my bumper guard.

FIG. 3 is a top view of one of my bumper guards on a motor vehicle bumper.

DESCRIPTION OF A PREFERRED EMBODIMENT

Referring now more particularly to the drawings wherein like numerals refer to like parts throughout the several views, the preferred embodiment of my bumper guard for motor vehicles is generally shown by reference numeral 10 in the drawings. FIG. 1 shows a pair of my bumper guards on the bumper 11 of a truck. To illustrate the vertical adjustability of the bumper guards, one of them is shown in its lower mounting position while the other is shown in its upper mounting position.

My bumper guard comprises a channel-shaped steel base plate 12 carrying a nonabrasive, cushioning member 13. The cushioning member 13 is made of a tough but resilient rubber-like material preferably having a durometer hardness of about 50—70. The cushioning member is slightly longer than the metal base plate and is molded so as to have the wing flanges 12a of the base plate imbedded in the cushion member 13 whereby no metal is exposed on the upper, lower, forward or side faces of the cushioning member.

The cushioning member has an aperture 14 extending therethrough to provide additional flexibility without sacrificing toughness.

The base plate 12 has an elongated slot 15 formed therein with an enlargement 15a at the lower end thereof for receiving the head of an attaching bolt 16 therethrough. The cushioning member has a groove 17 formed in the rear face thereof to accommodate the head of bolt 16. The groove 17 extends at least the full length of slot 15 and its enlarged end 15a to permit the bolt head to be inserted through the enlarged end and slipped to any point in the slot for mounting the bumper guard at the desired elevation on the bumper of the vehicle.

The bolt 16 has a squared intermediate portion 16a which is held in slot 15 to prevent the bolt from turning while the nut 18 is being tightened or loosened.

While a separate attaching bolt is shown in the drawings, it is understood that the regular bumper bolts may be employed for mounting the bumper guards if the spacing of the regular bumper bolts does not conform to the desired spacing for the bumper guards. In such an instance, the bumper guards may be quickly and easily mounted by merely loosening the nut on the regular bumper bolt and inserting the head of the bolt through the enlarged end 15a of the mounting slot 15, sliding the guard to the desired height and then securing same by retightening the nut.

If the attachment is to be mounted at some other spacing than that of the bumper bolts, the bumper is merely drilled at the desired points and the guard may be secured with the bolt as shown in the drawings.

Depending on the vertical cross-sectional configuration of the bumper, it may be desirable to shim the guards to obtain vertical alignment thereof.

It is understood that my invention is not confined to the particular construction, arrangement of parts or materials herein illustrated and described, but embraces all equivalents thereof.

I claim:

1. A bumper guard assembly comprising:
   a. a rigid base plate having a substantially vertical elongated mounting slot, one portion of which is enlarged;
   b. a cushioning member of resilient material rigidly secured to said base plate and having a longitudinally extending groove formed therein, said groove being aligned and communicating with a substantial portion of the length of said slot, including said enlarged end thereof, said cushioning member being additionally formed with at least one opening within and extending through said member to improve the cushioning effect of said member upon impact, and c. fastener means extending through said enlarged portion of said slot and having its head end disposed behind said plate in the said groove of said cushioning member, said fastener means being slidable vertically relative to said groove for movement of the guard to the desired mounting position.

2. The bumper guard of claim 1 wherein said rigid base plate is channel-shaped having wing flanges embedded in and bonded to said resilient cushioning member.